United States Patent
Xie et al.

(10) Patent No.: US 11,082,741 B2
(45) Date of Patent: Aug. 3, 2021

(54) DYNAMIC MULTI-CONTENT DELIVERY NETWORK SELECTION DURING VIDEO PLAYBACK

(71) Applicant: HULU, LLC., Santa Monica, CA (US)

(72) Inventors: Lan Xie, Beijing (CN); Shenglan Huang, Beijiang (CN); Wenhao Zhang, Beijing (CN); Deliang Fu, Beijing (CN); Shun Ni, Beijing (CN); Qiang She, Beijing (CN); Yanping Zhou, Beijing (CN); Yicheng Liu, Beijing (CN); Yuting Gui, Beijing (CN)

(73) Assignee: HULU, LLC, Santa Monica, CA (US)

(*) Notice: Subject to any disclaimer, the term of this patent is extended or adjusted under 35 U.S.C. 154(b) by 0 days.

(21) Appl. No.: 16/688,892

(22) Filed: Nov. 19, 2019

(65) Prior Publication Data

US 2021/0152882 A1 May 20, 2021

(51) Int. Cl.
*H04N 21/442* (2011.01)
*H04N 21/4425* (2011.01)
*H04N 21/44* (2011.01)
*H04N 21/845* (2011.01)

(52) U.S. Cl.
CPC . *H04N 21/44209* (2013.01); *H04N 21/44004* (2013.01); *H04N 21/4425* (2013.01); *H04N 21/8456* (2013.01)

(58) Field of Classification Search
CPC ....... H04N 21/44209; H04N 21/44004; H04N 21/4425; H04N 21/8456
See application file for complete search history.

(56) References Cited

U.S. PATENT DOCUMENTS

| | | | |
|---|---|---|---|
| 5,646,676 A | 7/1997 | Dewkett et al. | |
| 5,684,963 A | 11/1997 | Clement | |
| 6,205,477 B1 | 3/2001 | Johnson et al. | |
| 6,591,383 B1 * | 7/2003 | Michel | H03M 13/09 714/704 |
| 7,742,485 B2 | 6/2010 | Zhang | |

(Continued)

FOREIGN PATENT DOCUMENTS

KR 10-2010-0054661 A 5/2010

OTHER PUBLICATIONS

International Search Report & Written Opinion for PCT Application PCT/US2016/017380 dated Jun. 8, 2016, 16 pages.

(Continued)

*Primary Examiner* — Jefferey F Harold
*Assistant Examiner* — Franklin S Andramuno
(74) *Attorney, Agent, or Firm* — Fountainhead Law Group P.C.

(57) ABSTRACT

In some embodiments, a method receives one or more segments for content from a first content delivery network during a playback session for the content. The content includes a number of segments. The method evaluates buffer occupancy of a buffer configured to store segments of the content for playback and evaluates a number of times of a failure to download a segment for the content. The buffer occupancy is compared to a first threshold and the number of times of the failure to a second threshold. The method determines a switch from the first content delivery network to a second content delivery network during the playback session based on the comparing.

20 Claims, 10 Drawing Sheets

(56) References Cited

U.S. PATENT DOCUMENTS

| | | |
|---|---|---|
| 7,895,445 B1 | 2/2011 | Albanese et al. |
| 8,117,306 B1 | 2/2012 | Baumback et al. |
| 8,169,916 B1 | 5/2012 | Pai et al. |
| 8,276,180 B1 | 9/2012 | Slavenburg et al. |
| 8,370,208 B1 | 2/2013 | Gupta et al. |
| 8,438,393 B2 | 5/2013 | Zhang |
| 8,707,375 B2 | 4/2014 | Hainline |
| 8,843,972 B2 | 9/2014 | Calisa et al. |
| 9,078,020 B2 | 7/2015 | Buehl et al. |
| 9,204,103 B1 | 12/2015 | Zhang et al. |
| 9,712,850 B2 | 7/2017 | Buehl et al. |
| 2002/0059573 A1 | 5/2002 | Nishio et al. |
| 2004/0226045 A1 | 11/2004 | Nadarajah |
| 2005/0033858 A1 | 2/2005 | Swildens et al. |
| 2006/0168632 A1 | 7/2006 | Honda et al. |
| 2008/0215718 A1 | 9/2008 | Stolorz et al. |
| 2008/0306999 A1 | 12/2008 | Finger et al. |
| 2009/0125393 A1 | 5/2009 | Hwang et al. |
| 2009/0168752 A1 | 7/2009 | Segel |
| 2010/0036954 A1 | 2/2010 | Sakata et al. |
| 2010/0070603 A1 | 3/2010 | Moss et al. |
| 2010/0202509 A1* | 8/2010 | Thompson .......... H04N 21/643 375/240.01 |
| 2010/0228819 A1 | 9/2010 | Wei |
| 2011/0019627 A1 | 1/2011 | Krishnaswamy et al. |
| 2011/0078327 A1 | 3/2011 | Li et al. |
| 2011/0196894 A1 | 8/2011 | Farber et al. |
| 2012/0079524 A1 | 3/2012 | Kalidindi et al. |
| 2012/0089843 A1 | 4/2012 | Kato et al. |
| 2012/0297410 A1 | 11/2012 | Lohmar et al. |
| 2013/0013377 A1 | 1/2013 | Kruglick |
| 2013/0013688 A1 | 1/2013 | Wang et al. |
| 2013/0268577 A1 | 10/2013 | Oyman |
| 2014/0089998 A1 | 3/2014 | Buehl et al. |
| 2014/0108671 A1 | 4/2014 | Watson et al. |
| 2014/0149794 A1* | 5/2014 | Shetty .................. G06F 16/183 714/20 |
| 2014/0181285 A1 | 6/2014 | Stevens et al. |
| 2014/0365613 A1 | 12/2014 | Phillips et al. |
| 2015/0012593 A1 | 1/2015 | Phillips et al. |
| 2015/0382057 A1 | 12/2015 | Huang et al. |
| 2016/0234069 A1 | 8/2016 | Coudurier et al. |
| 2016/0337426 A1* | 11/2016 | Shribman ............. H04L 65/608 |
| 2017/0188059 A1* | 6/2017 | Major ................ H04N 21/2747 |
| 2018/0241796 A1* | 8/2018 | Srinivasan ............. H04L 65/80 |
| 2018/0373580 A1* | 12/2018 | Ertl ..................... G06F 11/3409 |

OTHER PUBLICATIONS

Extended European Search Report & Opinion for EP Application 16749817.9 dated Jul. 20, 2018, 9 pages.

* cited by examiner

DYNAMIC MULTI-CONTENT DELIVERY NETWORK SELECTION DURING VIDEO PLAYBACK

BACKGROUND

A provider, such as a provider of content that can be downloaded by clients, may use multiple content delivery networks (CDNs). The content delivery networks are entities that send (e.g., stream) the content to clients being used by users of a service provided by the provider. When a request for content is received, the provider may select a content delivery network to process the request. The selected content delivery network can then send the content to the client, such as by streaming the video from servers owned by the content delivery network to the client.

During the streaming, problems may occur. When this occurs, the client may experience playback issues. Typically, the client would have to wait until the problem is resolved at the content delivery network during which the client may experience playback issues.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a content streaming system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

A content delivery network may store (e.g., cache) content (e.g., video and/or audio) and deliver (e.g., stream) the content to client devices. A provider may use multiple content delivery networks from different vendors to deliver the same content to clients. For example, multiple content delivery networks may be able to respond to a request for content (e.g., the same video) and send the content to the client. When a request from a client is received for content, the provider may select a content delivery network to process the request. The selected content delivery network may then send the content to the client. The selected content delivery network may be initially selected based on it being determined to provide the optimal network conditions for downloading the content. However, during the session in which the content is being sent to the client, the playback conditions may vary. For example, at some point, playback issues, such as playback failure or rebuffering, may occur. The playback failure may result when there is a failure at the content delivery network and the content cannot be downloaded by the client, and the playback session ends. Rebuffering is where not enough content is being received and stored in a buffer to support continuous playback at the client. This results in rebuffering and playback is interrupted.

In some embodiments, a client may predict future playback performance and determine when to switch from a first content delivery network to a second content delivery network during a playback session for the content. In some embodiments, the client may predict whether playback failure or playback rebuffering may occur. Depending on the prediction, the client may decide to switch to another content delivery network. After the switch, better playback conditions may result and the chance of playback failure or playback rebuffering may be reduced.

System Overview

Figure 1:
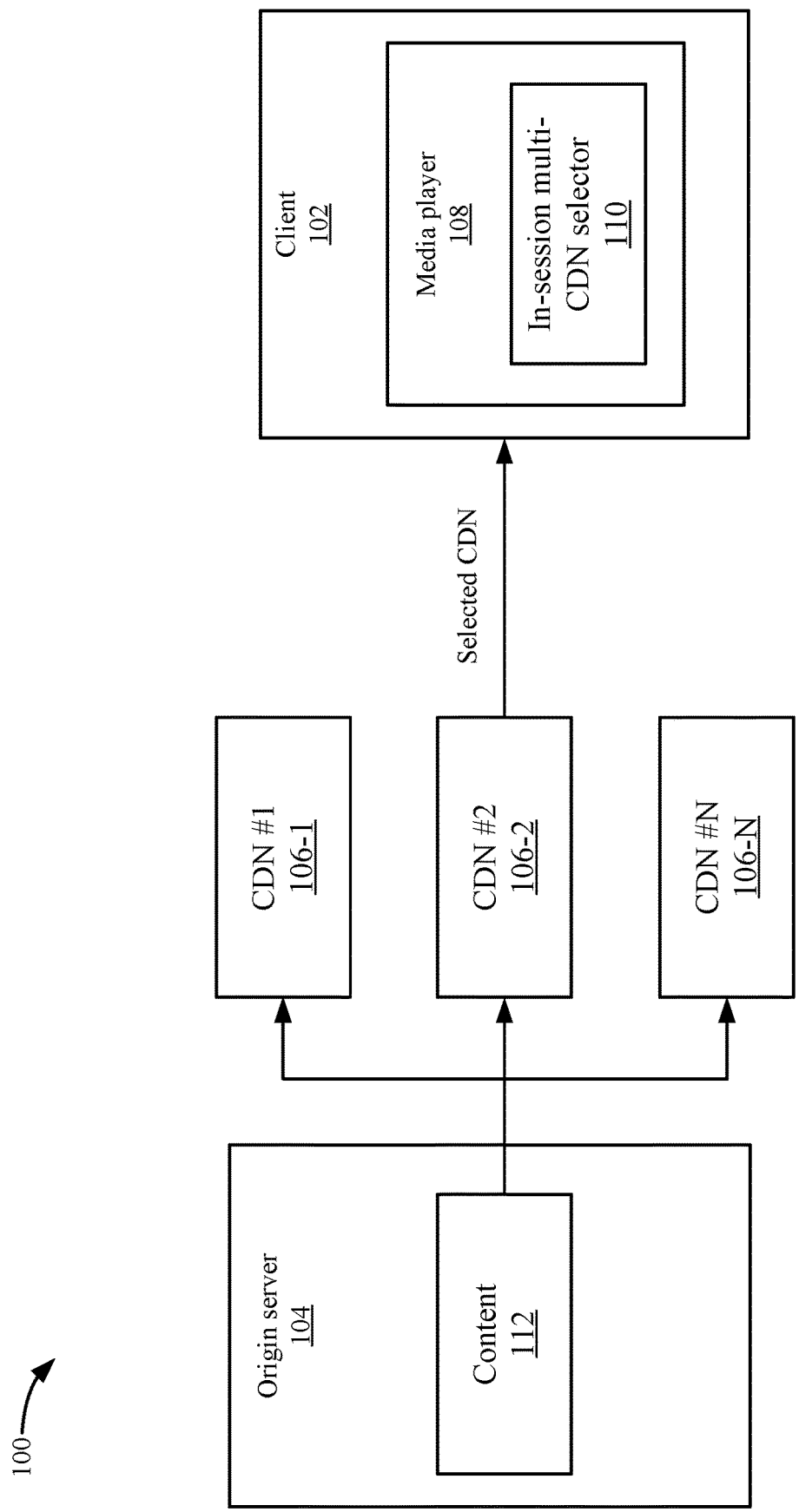
FIG. 1 depicts a simplified system for performing an in-session change of content delivery networks according to some embodiments.

FIG. 1 depicts a simplified system 100 for performing an in-session change of content delivery networks according to some embodiments. System 100 includes a client 102, an origin server 104, content delivery networks (CDNs) #1 to #N 106-1 to 106-N.

Origin server 104 may store representations of content in storage 112. The representations may include different playback characteristics for the content, such as different representations of a video at different bitrates. Origin server 104 may provide the representations of content to different content delivery networks #1 to #N. Each content delivery network 106 may independently be able to send the content to client 102. For example, each content delivery network 106 may include one or more servers that can send the content to client 102.

Client 102 may include a computing device, such as a smartphone, set top box, tablet device, living room device, gaming console, etc. Client 102 includes a media player 108 that can play the content. Client 102 may select one of the content delivery networks to begin playing the content, such as a CDN #2. Client 102 may experience different playback conditions for each content delivery network 106. For example, the playback conditions may differ based on the network being used by each content delivery network 106 and the servers being used. This results in the content being delivered at different available bandwidths to client 102.

Client 102 may then receive the content from content delivery network 106 during a playback session. An in-session multi-CDN selector 110 may switch from a CDN 106 being used during a session of playing content to another CDN 106. This may be different from an initial selection of a content delivery network 106 before the content begins playing in that the switch is after the content starts playing. A session may start when the content begins playing and continues to when the content ends playing. For example, the content may include video that is an hour long and the session may encompass the hour-long playing of the video. During the session, in-session multi-CDN selector 110 may predict the future playback performance and determine if a switch from a first content delivery network 106 to a second content delivery network 106 should be performed, such as from a CDN #1 to a CDN #2.

By using in-session multi-CDN selector 110, client 102 can switch between content delivery networks to reduce playback issues, such as playback failure, and also reduce playback rebuffering during a playback session for content. As discussed above, in a playback session, if one content delivery network 106 is experiencing playback issues, and media player 108 still uses that content delivery network 106, playback failure or playback rebuffering may occur. When this occurs, the playback failure of the content occurs and playback stops, or playback may be interrupted. If a playback failure occurs, the failure ends the session and client 102 may have to request the content again in a separate session. Also, in a playback session, the bandwidth between client 102 and a content delivery network 106 may vary over time. When poor bandwidth occurs, client 102 may not content fast enough to support continuous playback in media player 108. If rebuffering occurs, then playback of the content is interrupted in media player 108. The playback rebuffering may interrupt continuous playback and affect the user experience of viewing the content. However, in-session multi-CDN selector 110 can predict the possibility of the playback issues, and switch to a different content delivery network 106 before the issue occurs. After the switch to another content delivery network 106, which may not be experiencing playback issues, media player 108 may experience a reduced chance of rebuffering or a failure at a content delivery network 106 may be avoided.

Figure 2:
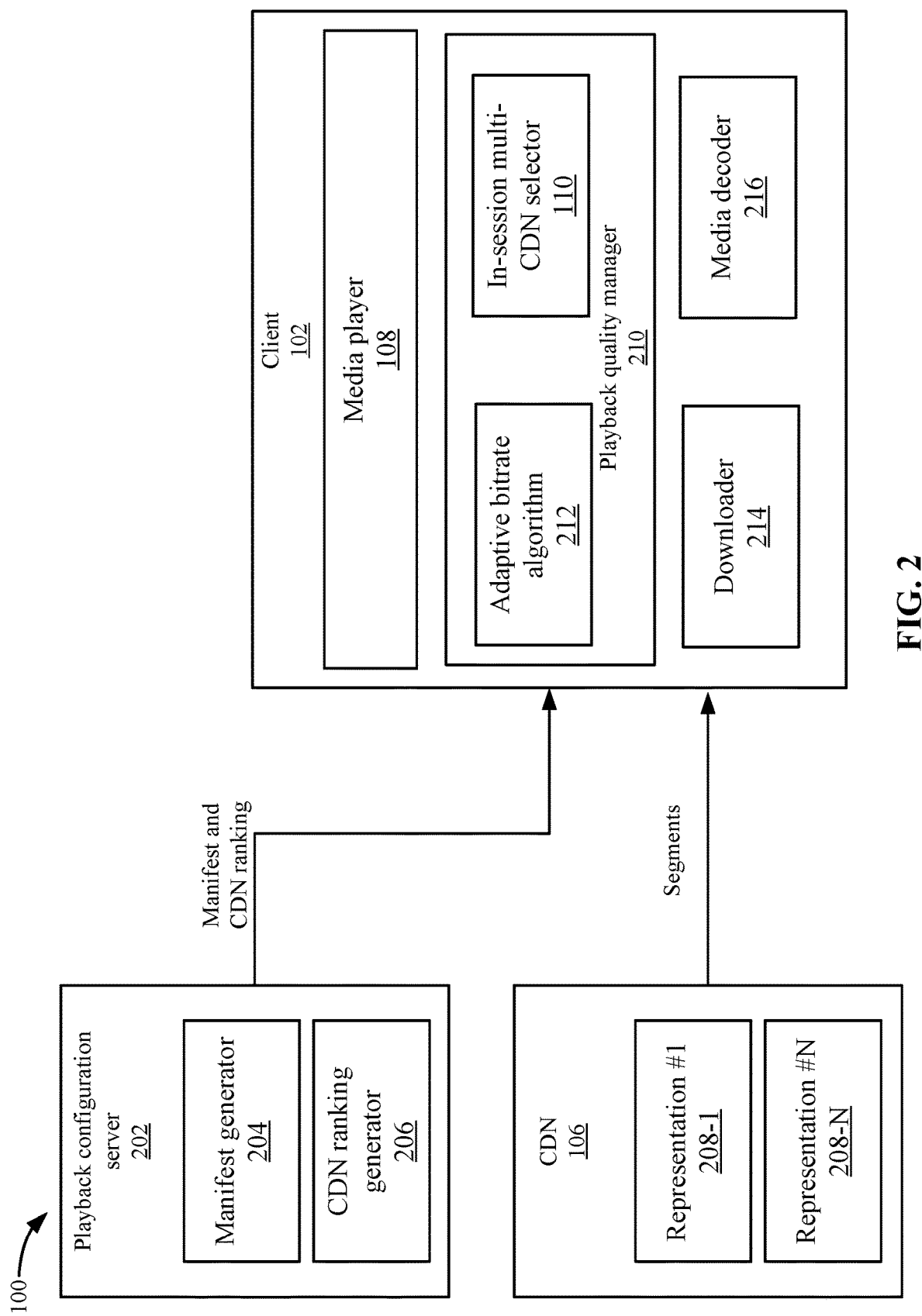
FIG. 2 depicts a more detailed example of the system according to some embodiments.

FIG. 2 depicts a more detailed example of system 100 according to some embodiments. Client 102 includes a playback quality manager 210, a downloader 214, and a media decoder 216. Playback quality manager 210 also includes an adaptive bitrate algorithm 212 and in-session multi-CDN selector 110.

Content delivery network 106 stores the content to respond to requests from client 102. Each piece of content may be encoded in different representations 208-1 to 208-N according to different encoding parameters. The different representations 208-1 to 208-N include different playback characteristics, such as different bitrates (e.g., a low bitrate, medium bitrate, high bitrate, etc.). Also, each representation 208 may include multiple segments. Each representation 208 for a piece of content includes the segments of the same length such that client 102 can switch between requesting segments from different representations 208 during a playback session.

Client 102 may interact with the user and receive requests from the user, such as to play the content. Client 102 may determine download decisions, such as using playback quality manager 210, that selects the content representation, content delivery network, and download action. Client 102 sends requests using downloader 214 to a server of content delivery network 106. Once receiving the content, media decoder 216 decodes the content.

A playback configuration server 202 may include a manifest generator 204 and CDN ranking generator 206. Manifest generator 204 generates a manifest that describes information for the content, such as the properties of the representations, content delivery networks that can be used, etc. For example, a media presentation description (MPD) is a manifest in a protocol of DASH (e.g., Dynamic Adaptive Streaming over HyperText Transfer Protocol (HTTP)), but other protocols may be used. Manifest generator 204 may generate a manifest for content. The manifest may identify segments for the content, which may be portions of the content, such as one-second, two-second, three-second, or four-second portions of content. The manifest may identify each segment individually with different identifiers, such as uniform resource locators (URLs).

CDN ranking generator 206 may generate a content delivery network ranking that ranks each content delivery network 106 in terms of priority. CDN ranking generator 206 may analyze historical playback characteristics for each content delivery network 106 and rank each content delivery network 106 based on these statistics. CDN ranking generator 206 may also predict which content delivery network 106 may provide the best future playback characteristics when generating the ranking. For example, CDN ranking generator 206 may rank CDN #2 in the number one position, CDN #1 in the number two position, etc.

Client 102 receives the manifest and the content delivery network ranking, and can select a content delivery network 106 to request the content. For example, downloader 214 may select the top-ranked content delivery network 106. Then, downloader 214 uses the manifest to request segments from the content. As discussed above, content delivery network 106 may include different representations of the content that include different characteristics, such as different bitrates. Adaptive bitrate algorithm 212 selects one of the representations based on different network conditions, such as available bandwidth. For example, if available bandwidth is high, then a higher bitrate representation is selected. However, if available bandwidth is low, then adaptive bitrate algorithm 212 may select a representation 208 that has a lower bandwidth.

When client 102 receives the segments, media decoder 216 decodes the segments. Media decoder 216 can store the segments in a buffer (not shown). Media player 108 retrieves the content from the buffer and plays back the video at a playback rate. As long as enough content is stored in the buffer to support the playback rate, playback rebuffering will not result.

At times during the playback session, adaptive bitrate algorithm 212 may analyze the network conditions, such as available bandwidth, and request different representations 208. For example, if available bandwidth goes down, then adaptive bitrate algorithm 212 selects a representation 208 with a lower bandwidth. However, if available bandwidth goes up, then adaptive bitrate algorithm 212 selects a representation 208 with a higher bandwidth.

Figure 3:
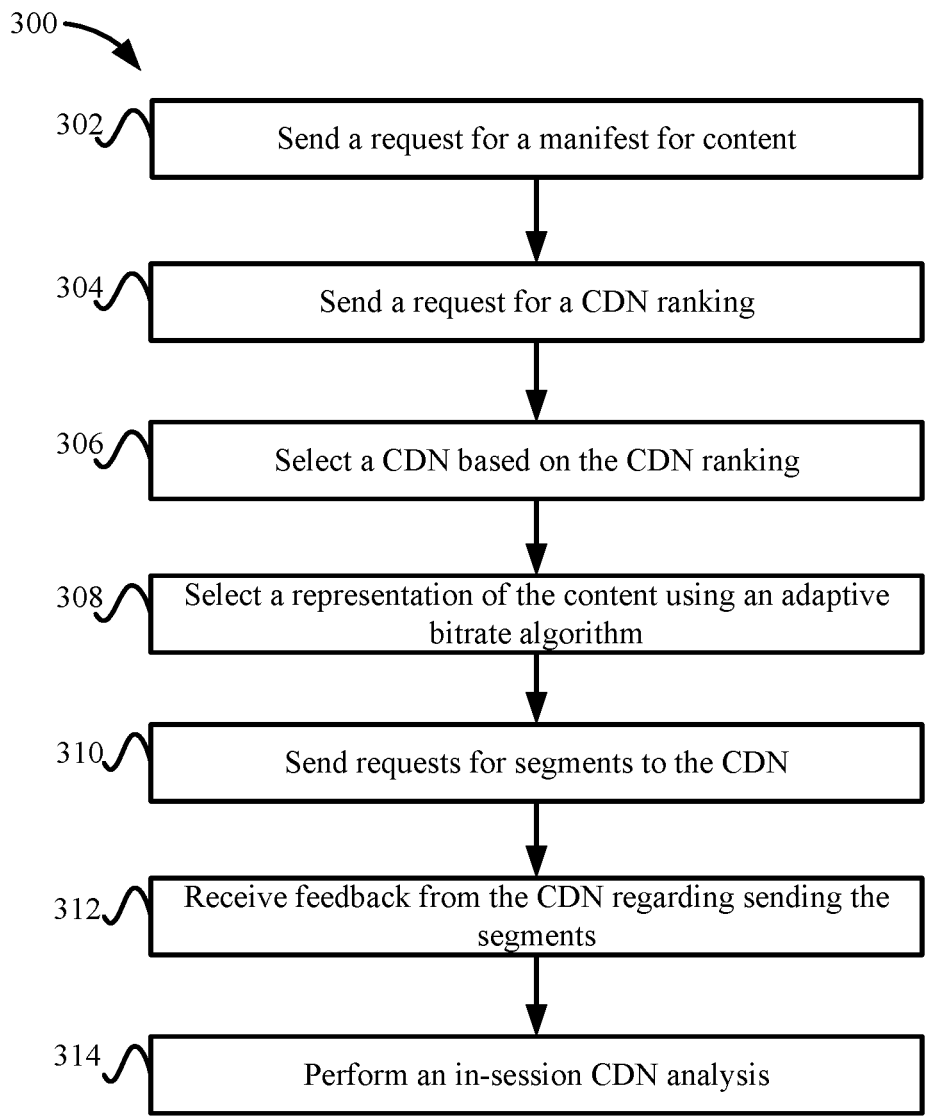
FIG. 3 depicts a simplified flowchart of a method for performing playback of content by a client during a playback session according to some embodiments.

FIG. 3 depicts a simplified flowchart 300 of a method for performing playback of content by client 102 during a playback session according to some embodiments. At 302, client 102 sends a request for a manifest that is associated with the content. At 304, client 102 also sends a request for a content delivery network ranking. Client 102 then receives the manifest and the content delivery network ranking.

Then, at 306, client 102 selects a content delivery network based on the content delivery network ranking. For example, client 102 may select the highest-ranked content delivery network 106 from the CDN ranking. Also, at 308, client 102 selects a representation 208 of the content using an adaptive bitrate algorithm 212. As discussed above, client 102 may use the available bandwidth to select which representation to request.

Once selecting content delivery network 106 and the representation, at 310, client 102 sends requests for segments to content delivery network 106. At 312, client 102 receives feedback from content delivery network 106 regarding the sending of the segments. The feedback may include playback characteristics, such as the time to first byte (used to calculate the round trip time), the protocol used (e.g. HTTP/1.1, HTTP/2, etc.), the status code (e.g., 200, 206, 500, etc.), and other information.

While the playback session is occurring for the content, at 314, client 102 performs an in-session content delivery network analysis.

In-Session Content Delivery Network Switch

Figure 4:
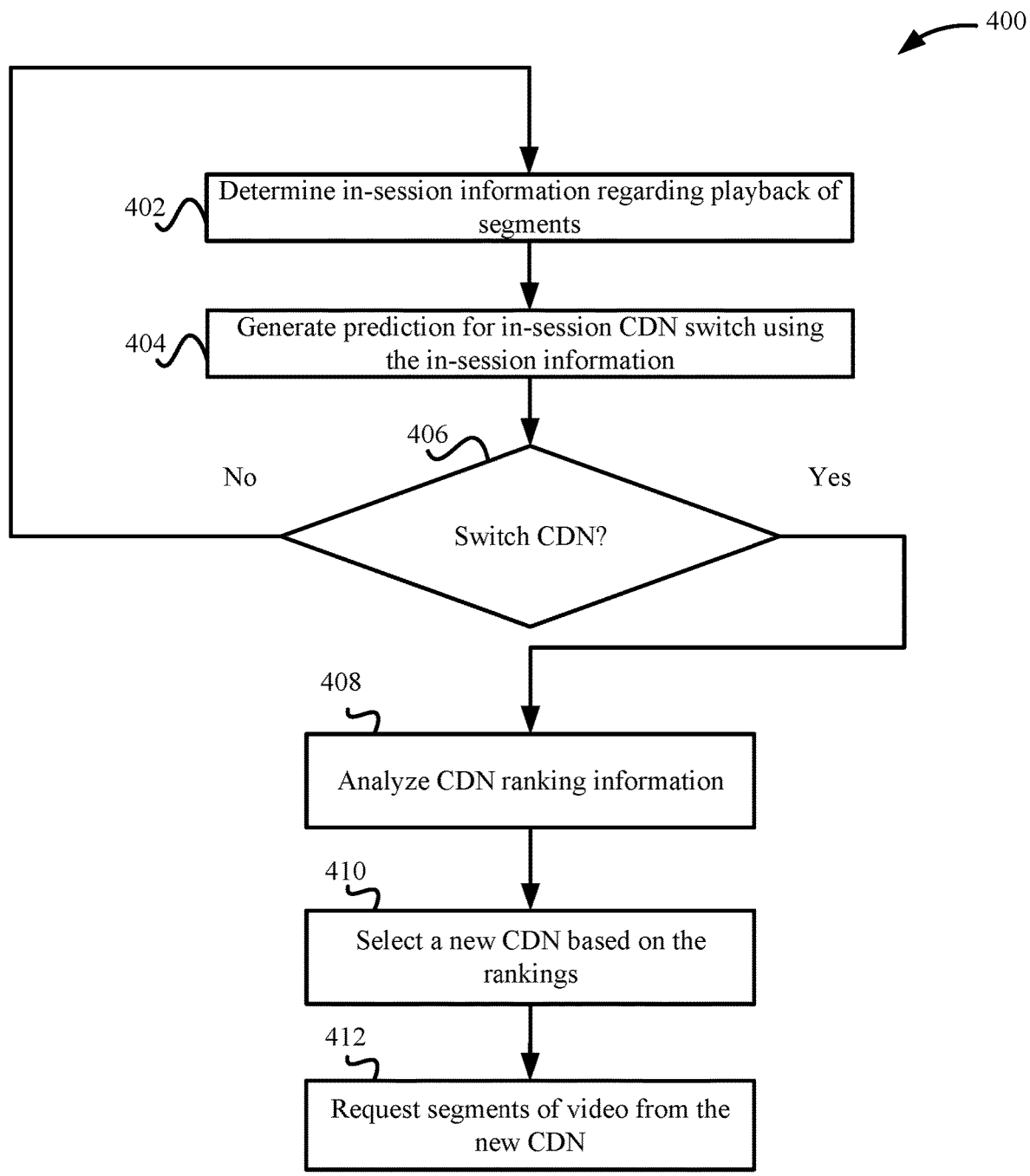
FIG. 4 depicts a simplified flowchart for determining when to switch to a different content delivery network according to some embodiments.

The following will describe the analysis to determine whether to switch to another content delivery network during a playback session according to some embodiments. FIG. 4 depicts a simplified flowchart 400 for determining when to switch to a different content delivery network 106 according to some embodiments. At 402, client 102 determines in-session playback information regarding the playback of segments. The in-session information may include download-related information and playback-related information. Download-related information may include the representation of the content, the content delivery network characteristics, a segment type, whether download of a segment has been successful or not, predicted network bandwidth, and other information. The playback-related information may include buffer occupancy, available content delivery networks 106, available representations, etc. At 404, in-session multi-CDN selector 110 generates a prediction for an in-session CDN switch using the in-session playback information. The generation of the prediction will be described in more detail below.

At 406, in-session multi-CDN selector 110 determines whether to switch to another content delivery network 106. If not, the process reiterates to 402 to continue evaluating in-session information as playback continues. If in-session multi-CDN selector 110 determines that a switch to a new content delivery network 106 should be performed, at 408, in-session multi-CDN selector 110 analyzes the CDN ranking information. For example, in-session multi-CDN selector 110 may determine which content delivery networks 106 are available in the CDN ranking. At 410, in-session multi-CDN selector 110 selects a new content delivery network 106 based on the rankings. For example, in-session multi-CDN selector 110 may select the highest ranked content delivery network 106 in the CDN ranking. At 412, client 102 requests segments of video from the new content delivery network 106.

Failure Prediction

Figure 5:
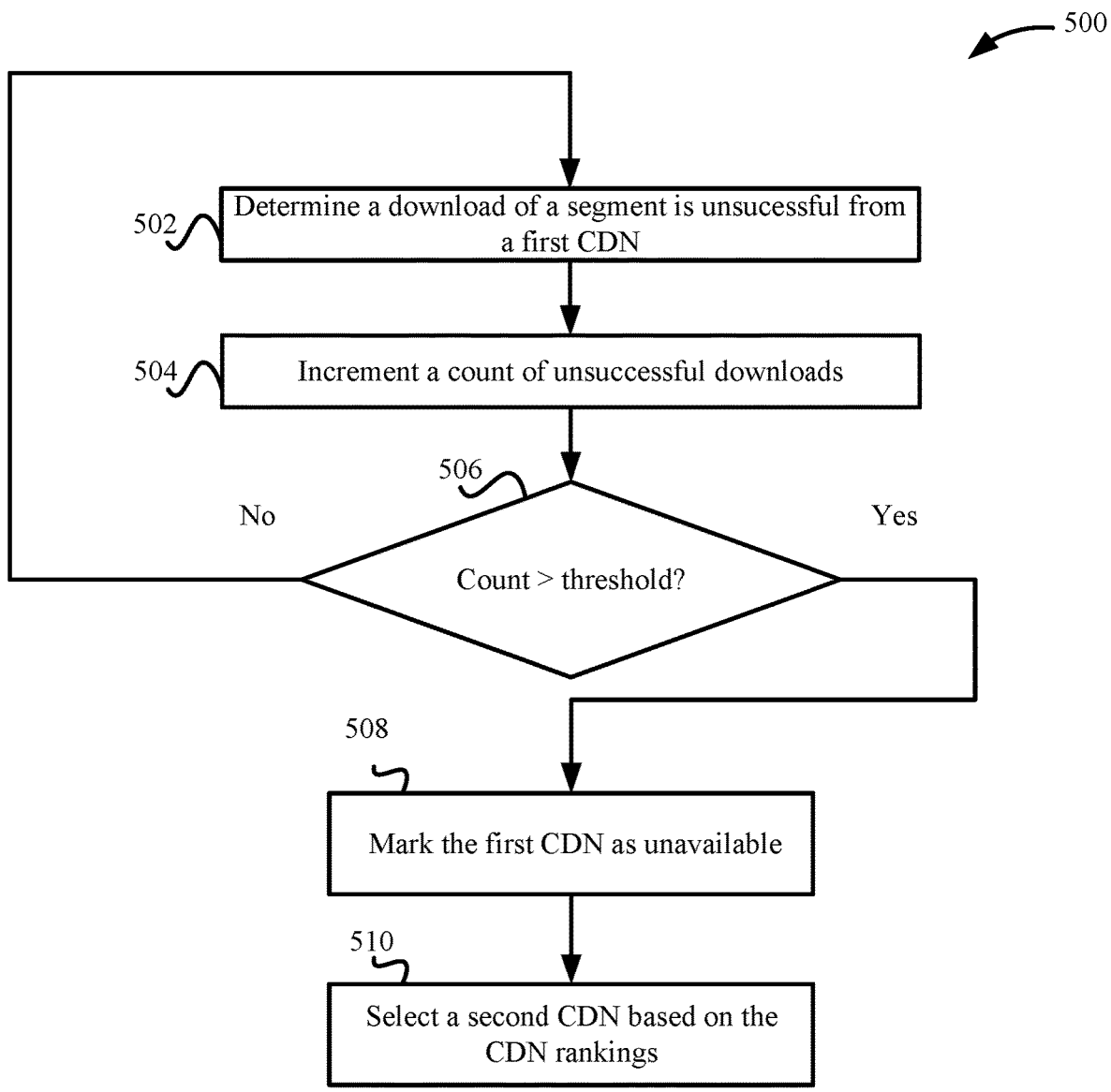
FIG. 5 depicts a simplified flowchart of a method for predicting a content delivery network failure according to some embodiments.

FIG. 5 depicts a simplified flowchart 500 of a method for predicting a content delivery network failure according to some embodiments. In-session multi-CDN selector 110 may use a prediction network to predict whether a playback issue may occur. In some embodiments, a decision tree is used to train a model of the prediction network to distinguish what is a key feature to identify when a playback issue occurs with a content delivery network 106. An issue with a feature may lead to a playback failure or playback rebuffering. The decision tree may receive multiple input features for sessions, such as continuous download failure times, the number of rebuffering events, continuous download failure times in a lowest video representation or audio representation, etc. Each session may be labeled as successful or unsuccessful. Using the decision tree, the training of a prediction network may determine which feature may most accurately predict a playback issue.

In some embodiments, a number of times of a download failure occurs may be the best predictor to identify whether a playback issue may occur for a content delivery network 106. The number of times may measure the number of sequential segments that fail to be downloaded. In some examples, the download failure may occur when client 102 cannot download a segment within a certain time, such as when a timeout occurs and client 102 aborts trying to download that segment. In some embodiments, the times of download failure may be analyzed when a lowest bitrate video representation is being used on a specific content delivery network. That is, if a higher bitrate than the lowest possible bitrate representation is being used, then client 102 can switch to a lower bitrate representation to try and resolve the playback issue instead of switching to another CDN 106.

Referring to FIG. 5, at 502, in-session multi-CDN selector 110 determines a download of a segment is unsuccessful from a first content delivery network 106. The unsuccessful download may occur when the segment is not downloaded within a certain amount of time and a timeout occurs, which aborts the download of the segment.

At 504, in-session multi-CDN selector 110 increments a count of unsuccessful downloads. The count may only be incremented when consecutive segments in a manifest fail to download. In other examples, the count may be incremented when segments within a threshold, such as segments within one or two segments in the manifest are unsuccessfully downloaded. For example, a first segment is unsuccessfully downloaded, then a second segment successfully downloaded, but then a third segment is unsuccessfully downloaded. Because the first segment and the third segment are within one segment of each other (e.g., a threshold is within at least two segments), in-session multi-CDN selector 110 may increment the count.

At 506, in-session multi-CDN selector 110 determines if the count is greater than a threshold. For example, a threshold may indicate a number of segments, such as one segment, two segments, three segments, etc. If the count is not above a threshold, the process reiterates to 502 to continue to determine whether segments are unsuccessfully downloaded.

If the count is greater than a threshold, then at 508, in-session multi-CDN selector 110 marks the first content delivery network 106 as unavailable. Then, at 510, in-session multi-CDN selector 110 selects a new content delivery network 106 based on the CDN rankings.

Rebuffering Prediction

In-session multi-CDN selector 110 may consider buffer occupancy and network bandwidth to predict when playback rebuffering may occur. The playback rebuffering may be due to poor network conditions on the current content delivery network 106. In an example, calculation, in-session multi-CDN selector 110 may use an average buffer occupancy to determine when rebuffering may occur in addition to the predicted network bandwidth. The average buffer occupancy may be used over a period of time to avoid switching among content delivery networks 106 with too much frequency. For example, switching content delivery networks 106 may be minimized due to the change of content delivery networks being more disruptive than, for example, switching representations of content. For example, adaptive bitrate algorithm 212 may use an available bandwidth reading for the current time to determine whether to switch representations. This is because sending a request for a next segment in a different representation is not disruptive to playback. However, once a connection has already been established with one content delivery network 106, switching to another content delivery network 106 may be slightly disruptive and should be avoided if possible. For example, client 102 may need to download another manifest for the other content delivery network 106. Using the average buffer occupancy may avoid switching between content delivery networks 106.

Figure 6:
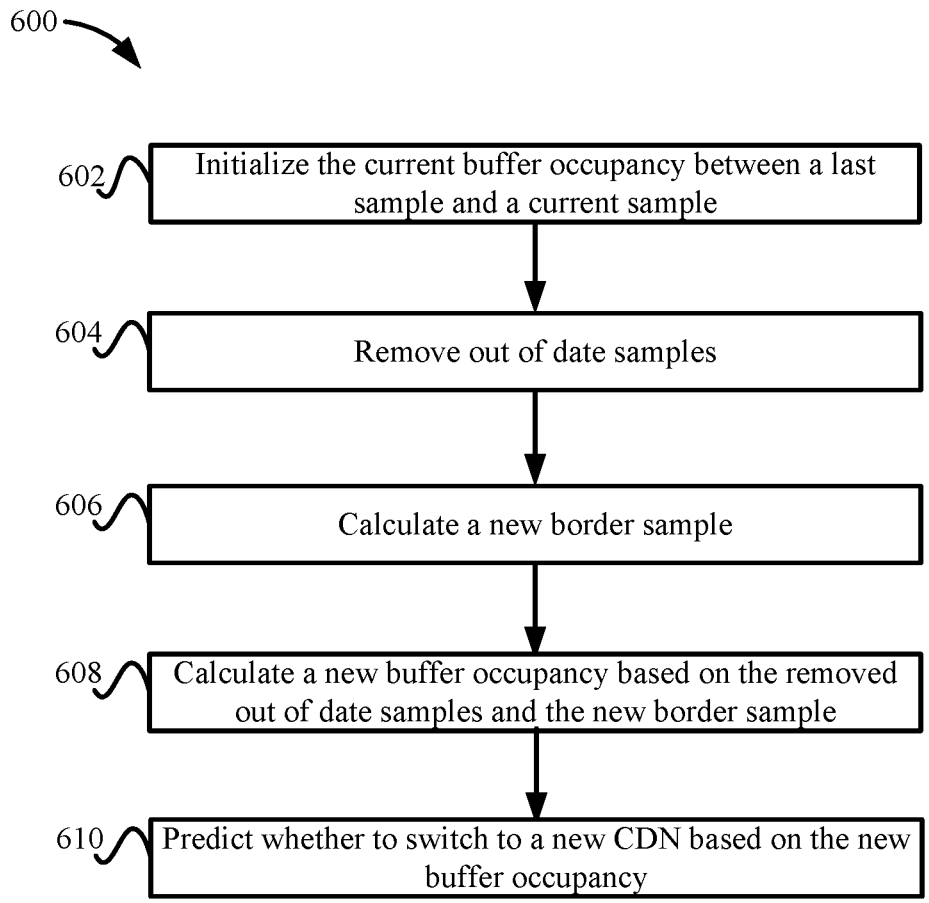
FIG. 6 depicts a simplified flowchart for predicting playback rebuffering according to some embodiments.

FIG. 6 depicts a simplified flowchart 600 for predicting playback rebuffering according to some embodiments. At 602, in-session multi-CDN selector 110 initializes a current buffer occupancy between a last sample and a current sample. In some embodiments, in-session multi-CDN selector 110 may use an average buffer occupancy, but other measurements may be used. Also, in-session multi-CDN selector 110 may calculate the average buffer occupancy based on an integral value of the buffer occupancy, but other calculations may be used. Specifically, in-session multi-CDN selector 110 may denote the buffer occupancy as a variable q at a time t. The integral value buffer occupancy is calculated as:

$$s = \int_{t-L}^{t} q\,dt,$$

where the variable L is a maximum duration of a time range and q is the buffer occupancy. Then, in-session multi-CDN selector 110 calculates the average buffer occupancy as s/L. In this case, the average buffer occupancy is lower than a threshold, such as $t_{danger}$, in-session multi-CDN selector 110 marks the buffer as meeting the threshold or in danger.

However, in the live operation of a real system, the buffer occupancy q is a discrete value. In-session multi-CDN selector 110 cannot calculate the above integral value and the average buffer occupancy precisely. This is because the samples of buffer occupancy may not be received in granularities that are required to calculate the average buffer occupancy. For example, it may be that samples are needed every second to evaluate the buffer occupancy, but the sampling rate may be just once every four seconds. The average buffer occupancy may be calculated according to several discrete observations. Each observation is the instantaneous value of buffer occupancy. Only if the observations are continuous can a precise value of average buffer occupancy be obtained. However, client 102 may not be able to receive the continuous observations of the buffer occupancy. In-session multi-CDN selector 110 calculates the integral value according to these observations as the average buffer occupancy. In other examples, in-session multi-CDN selector 110 can also use measurements or calculations of the observations, such as the average buffer occupancy.

Figure 7:
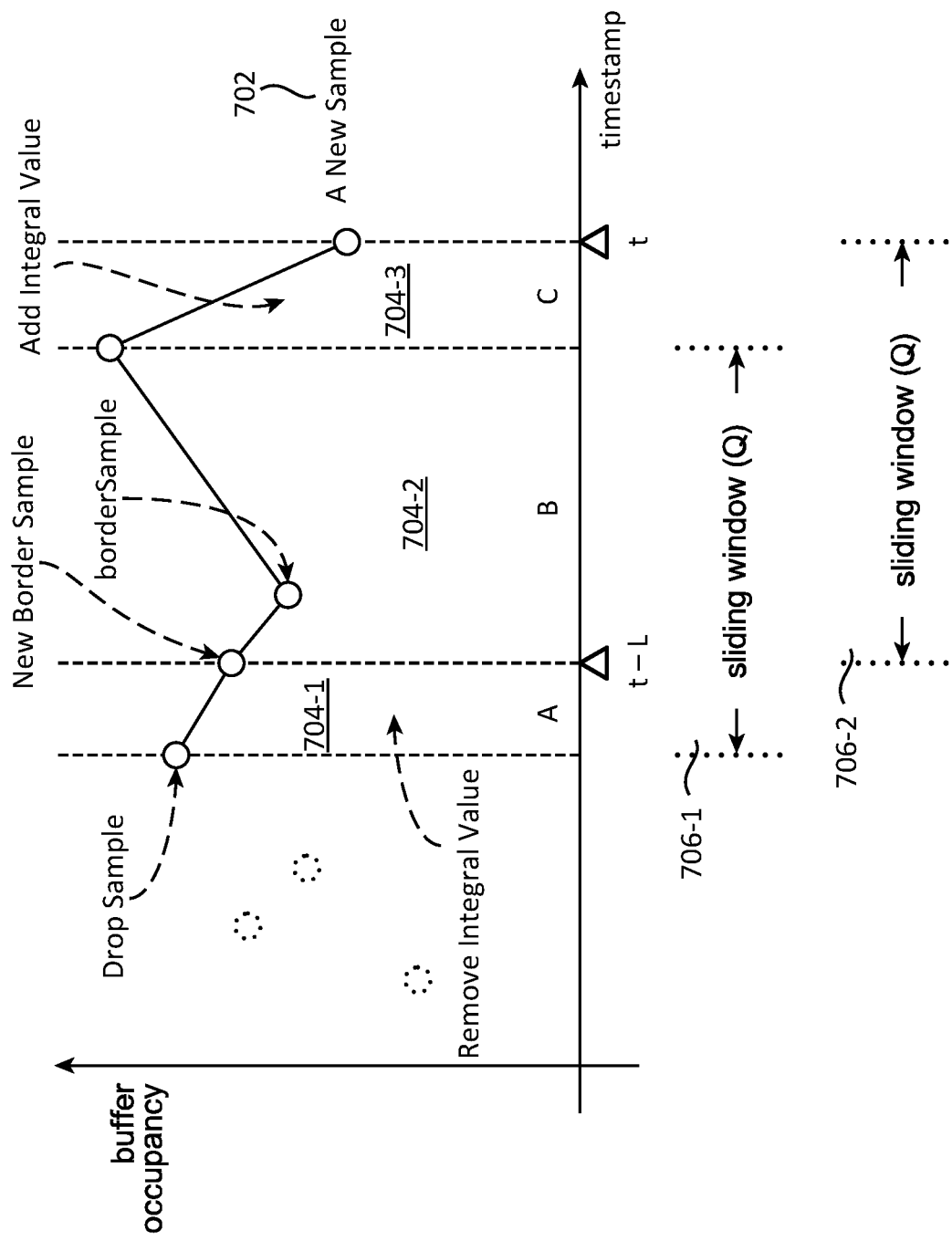
FIG. 7 depicts a graph that is used to determine the integral value of buffer occupancy according to some embodiments.

To determine the average buffer occupancy, in-session multi-CDN selector 110 may use a sliding window, such as a first-in, first-out queue, denoted as a variable Q, to store the discrete data and calculate an integral value of the buffer occupancy. Each sample in the queue may be a pair of buffer occupancy and the corresponding sampling time, e.g., Q={(q,t)}. Based on the queue, in-session multi-CDN selector 110 can calculate the average buffer occupancy. FIG. 7 depicts a graph 700 that is used to determine the integral value of buffer occupancy according to some embodiments. The Y axis is buffer occupancy and the X axis is time. Before a new sample at 702 is received, in-session multi-CDN selector 110 calculates the integral value of buffer occupancy using part A at 704-1 and part B at 704-2. After the new sample is received, in-session multi-CDN selector 110 calculates the integral value of buffer occupancy using part B at 704-2 and part C at 704-3. It is noted that the sliding window at 706-1 moves when the new sample is received to 706-2.

Referring back to FIG. 6, to calculate the buffer occupancy, at 604, in-session multi-CDN selector 110 removes out-of-date samples. For example, in FIG. 7, when a new sample is received at 702, in-session multi-CDN selector 110 removes samples in part A at 704-1.

Referring back to FIG. 6, at 606, in-session multi-CDN selector 110 calculates a new sample. The new sample may be interpolated based on prior values. The interpolation of the new sample may be used because in-session multi-CDN selector 110 may not receive samples at a granularity that is required to calculate the buffer occupancy. For example, a sample may be received every four seconds, but in-session multi-CDN selector 110 may require samples at every one second to calculate the average buffer occupancy. The interpolation is used to generate new samples until the actual samples are received and replace the interpolated samples. At 608, in-session multi-CDN selector 110 calculates a new buffer occupancy based on the removed out-of-date samples and the new order sample.

At 610, in-session multi-CDN selector 110 predicts whether to switch to a new content delivery network 106 based on the new buffer occupancy that is calculated.

In-Session Content Delivery Network Switch

Figure 8:
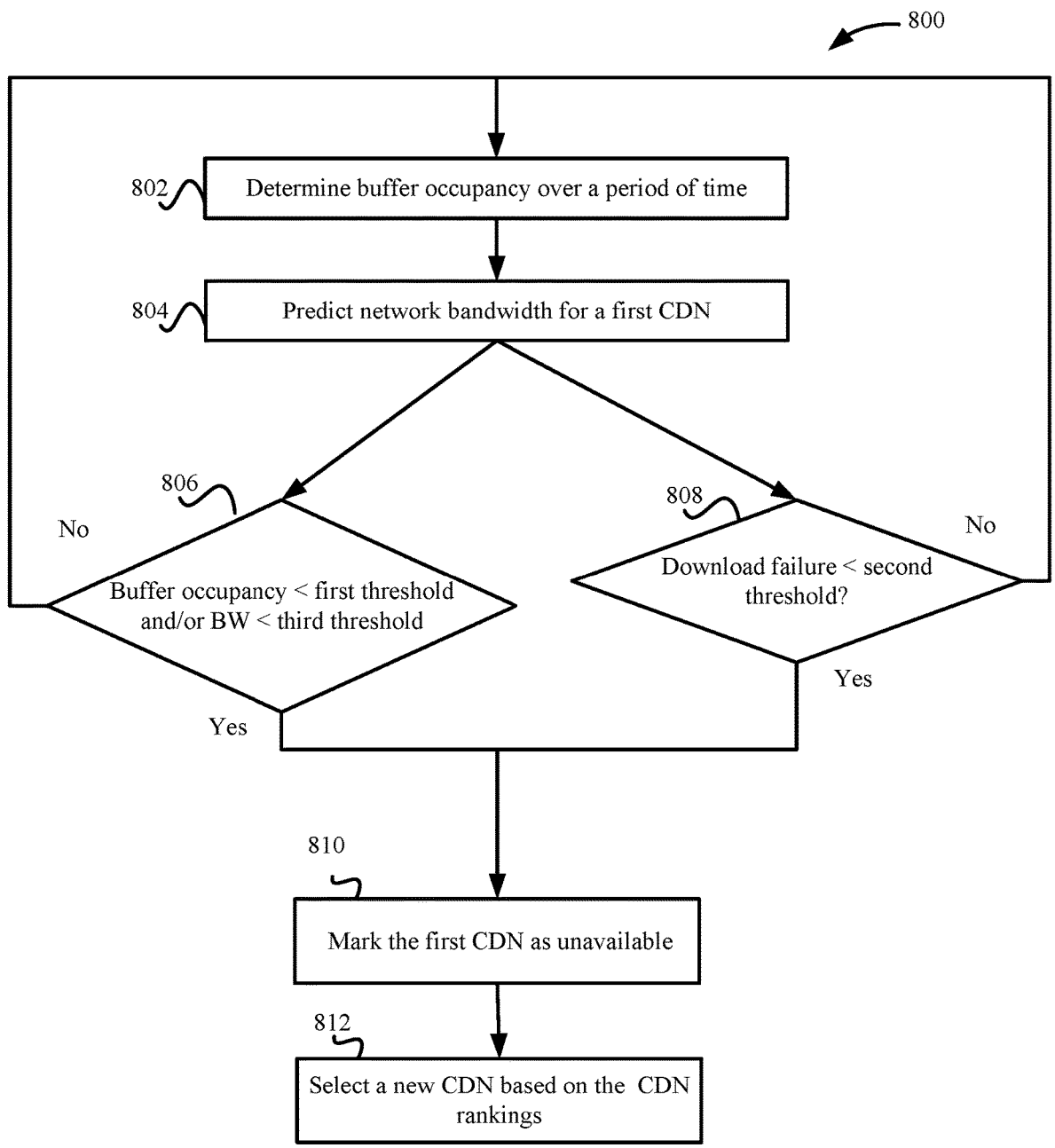
FIG. 8 depicts a simplified flowchart of a method for determining when to switch to another content delivery network according to some embodiments.

Once determining the above information, in-session multi-CDN selector 110 can determine whether to switch to another content delivery network 106 according to some embodiments. FIG. 8 depicts a simplified flowchart 800 of a method for determining when to switch to another content delivery network according to some embodiments. At 802, in-session multi-CDN selector 110 determines buffer occupancy over a period of time. For example, average buffer occupancy is used instead of an instantaneous buffer occupancy.

At 804, in-session multi-CDN selector 110 predicts network bandwidth for a first content delivery network 106. The prediction may predict future network bandwidth if the first content delivery network 106 still will be used. At 806, in-session multi-CDN selector 110 determines if buffer occupancy meets (e.g., is less than) a first threshold. For example, if buffer occupancy is less than a first threshold, then there may be a danger that rebuffering may occur. If the buffer occupancy is not less than a threshold, then the process reiterates to 802 to determine buffer occupancy again. Further, in-session multi-CDN selector 110 may or may not use the network bandwidth in the determination. For example, after determining buffer occupancy is less than the first threshold, in-session multi-CDN selector 110 may test the predicted network bandwidth. If predicted network bandwidth is lower than a third threshold, in-session multi-CDN selector 110 may determine there is a danger of rebuffering. The use of the two comparisons may indicate that network conditions for content delivery network 106 may be poor. Also, at 808, in-session multi-CDN selector 110 determines if number of download failures meets (e.g., is less than) a second threshold. If the number of downloads does not meet a threshold, then a problem of a playback failure may not be predicted. However, if the number of download failures does not meet the second threshold, then it may be possible that a playback failure may occur.

If buffer occupancy meets the first threshold and/or predicted bandwidth meets the third threshold, and/or the number of download failures meets the second threshold, then at 810, in-session multi-CDN selector 110 may mark the first content delivery network 106 as unavailable. It is noted that the buffer occupancy and the number of download failures may have to both meet the first threshold and the second threshold, respectively, or only one of the buffer occupancy and download failure needs to meet the first threshold and the second threshold, respectively. Different combinations may be used.

At 810, in-session multi-CDN selector 110 marks the first content delivery network 106 as unavailable. At 812, in-session multi-CDN selector 110 selects a new content delivery network 106 based on the CDN rankings.

In some embodiments, in-session multi-CDN selector 110 may not switch back to a content delivery network 106 for a certain time period after performing a switch. For example, content delivery network performance may have short-term spikes. In-session multi-CDN selector 110 may use a time out T to the available expiration time such that if a first content delivery network 106 is marked as unavailable at time t, it will be marked available at a time t+T. This allows in-session multi-CDN selector 110 to switch back to the content delivery network 106 that has been used, but only after a certain period of time in which performance may have recovered. This will prevent switching back to a content delivery network 106 that may have been experiencing performance problems.

CONCLUSION

Accordingly, some embodiments provide an in-session content delivery network switch that may improve the playback performance. This may reduce the number of playback failures and rebuffering occurrences, which will improve the playback experience.

Example Embodiments

In some embodiments, a method comprising: receiving, by a computing device, one or more segments for content from a first content delivery network during a playback session for the content, wherein the content includes a number of segments; evaluating, by the computing device, buffer occupancy of a buffer configured to store segments of the content for playback; evaluating, by the computing device, a number of times of a failure to download a segment for the content; comparing, by the computing device, the buffer occupancy to a first threshold and the number of times of the failure to a second threshold; and determining, by the computing device, a switch from the first content delivery network to a second content delivery network during the playback session based on the comparing.

In some embodiments, evaluating the buffer occupancy comprises: determining one or more samples of buffer occupancy during a time period; and calculating an average buffer occupancy during the time period using the one or more samples.

In some embodiments, comparing the buffer occupancy comprises: comparing the average buffer occupancy to the first threshold.

In some embodiments, determining the switch from the first content delivery network to the second content delivery network comprises: determining when the average buffer occupancy meets the first threshold.

In some embodiments, determining the switch from the first content delivery network to the second content delivery network comprises: when the average buffer occupancy meets the first threshold, determining a predicted network bandwidth; and determining when the predicted network bandwidth meets a third threshold.

In some embodiments, evaluating the buffer occupancy comprises: using a sliding window to determine a set of samples for buffer occupancy; and calculating an average buffer occupancy using the set of samples in the sliding window.

In some embodiments, evaluating the buffer occupancy comprises: receiving a new sample for a new time in the sliding window; removing an old sample that is not within the sliding window; and calculating the average buffer occupancy using the new sample and not the old sample.

In some embodiments, a value of the new sample is interpolated from other samples in the sliding window.

In some embodiments, evaluating the number of times of the failure comprises: counting the number of times of the failure for consecutive segments.

In some embodiments, evaluating the number of times of the failure comprises: counting the number of times of the failure for consecutive segments when using a lowest bitrate representation, wherein the content is available in a plurality of representations at different bitrates.

In some embodiments, the method further comprising: evaluating network bandwidth for receiving segments from the content; and comparing the network bandwidth to a third threshold.

In some embodiments, determining the switch from the first content delivery network to the second content delivery network is when the network bandwidth is below the third threshold and the buffer occupancy is below the first threshold.

In some embodiments, the method further comprising: switching from the first content delivery network to the second content delivery network by requesting a segment from the content from the second content delivery network.

In some embodiments, the method further comprising: upon switching from the first content delivery network to the second content delivery network, marking the first content delivery network as unavailable to be switched to for a period of time.

In some embodiments, the method further comprising: selecting the second content delivery network based on a ranking of a plurality of content delivery networks.

In some embodiments, a non-transitory computer-readable storage medium containing instructions, that when executed, control a computer system to be operable for: receiving one or more segments for content from a first content delivery network during a playback session for the content, wherein the content includes a number of segments; evaluating buffer occupancy of a buffer configured to store segments of the content for playback; evaluating a number of times of a failure to download a segment for the content; comparing the buffer occupancy to a first threshold and the number of times of the failure to a second threshold; and determining a switch from the first content delivery network to a second content delivery network during the playback session based on the comparing.

In some embodiments, evaluating the buffer occupancy comprises: determining one or more samples of buffer occupancy during a time period; and calculating an average buffer occupancy during the time period using the one or more samples.

In some embodiments, evaluating the number of times of the failure comprises: counting the number of times of the failure for consecutive segments.

In some embodiments, the method further comprising: evaluating network bandwidth for receiving segments from the content; and comparing the network bandwidth to a third threshold.

In some embodiments, an apparatus comprising: one or more computer processors; and a non-transitory computer-readable storage medium comprising instructions, that when executed, control the one or more computer processors to be operable for: receiving one or more segments for content from a first content delivery network during a playback session for the content, wherein the content includes a number of segments; evaluating buffer occupancy of a buffer configured to store segments of the content for playback; evaluating a number of times of a failure to download a segment for the content; comparing the buffer occupancy to a first threshold and the number of times of the failure to a second threshold; and determining a switch from the first content delivery network to a second content delivery network during the playback session based on the comparing.

System

Figure 9:
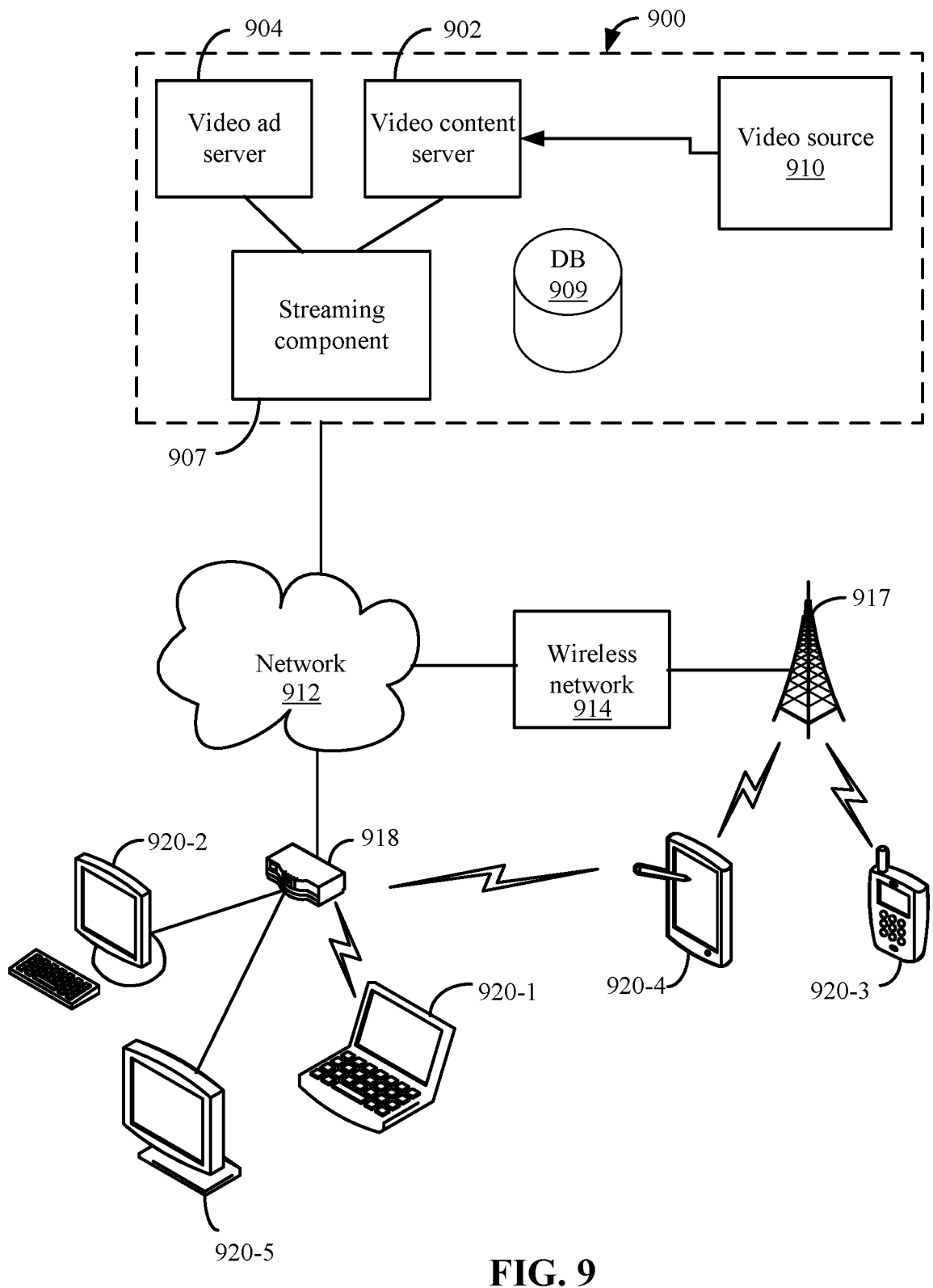
FIG. 9 depicts a video streaming system in communication with multiple client devices via one or more communication networks according to one embodiment.

Features and aspects as disclosed herein may be implemented in conjunction with a video streaming system 900 in communication with multiple client devices via one or more communication networks as shown in FIG. 9. Aspects of the video streaming system 900 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 900, video data may be obtained from one or more sources for example, from a video source 910, for use as input to a video content server 902. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 900 may include one or more computer servers or modules 902, 904, and/or 907 distributed over one or more computers. Each server 902, 904, 907 may include, or may be operatively coupled to, one or more data stores 909, for example databases, indexes, files, or other data structures. A video content server 902 may access a data store (not shown) of various video segments. The video content server 902 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 904 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 900, a public service message, or some other information. The video advertising server 904 may serve the video advertising segments as directed by a user interface controller (not shown).

The video streaming system 900 may further include an integration and streaming component 907 that integrates video content and video advertising into a streaming video segment. For example, streaming component 907 may be a content server or streaming media server. A controller (not shown) may determine the selection or configuration of advertising in the streaming video based on any suitable algorithm or process. The video streaming system 900 may include other modules or units not depicted in FIG. 9, for example, administrative servers, commerce servers, network infrastructure, advertising selection engines, and so forth.

The video streaming system 900 may connect to a data communication network 912. A data communication network 912 may comprise a local area network (LAN), a wide area network (WAN), for example, the Internet, a telephone network, a wireless cellular telecommunications network (WCS) 914, or some combination of these or similar networks.

One or more client devices 920 may be in communication with the video streaming system 900, via the data communication network 912, wireless cellular telecommunications network 914, and/or another network. Such client devices may include, for example, one or more laptop computers 920-1, desktop computers 920-2, "smart" mobile phones 920-3, tablet devices 920-4, network-enabled televisions 920-5, or combinations thereof, via a router 918 for a LAN, via a base station 917 for a wireless cellular telecommunications network 914, or via some other connection. In operation, such client devices 920 may send and receive data or instructions to the system 900, in response to user input received from user input devices or other input. In response, the system 900 may serve video segments and metadata from the data store 909 responsive to selection of media programs to the client devices 920. Client devices 920 may output the video content from the streaming video segment in a media player using a display screen, projector, or other video output device, and receive user input for interacting with the video content.

Distribution of audio-video data may be implemented from streaming component 907 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 907 may communicate with client device 920 using control messages and data messages to adjust to changing network conditions as the video is played. These control messages can include commands for enabling control functions such as fast forward, fast reverse, pausing, or seeking to a particular part of the file at the client.

Since streaming component 907 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 907 may use TCP-based protocols, such as HTTP and Real Time Messaging Protocol (RTMP). Streaming component 907 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 10:
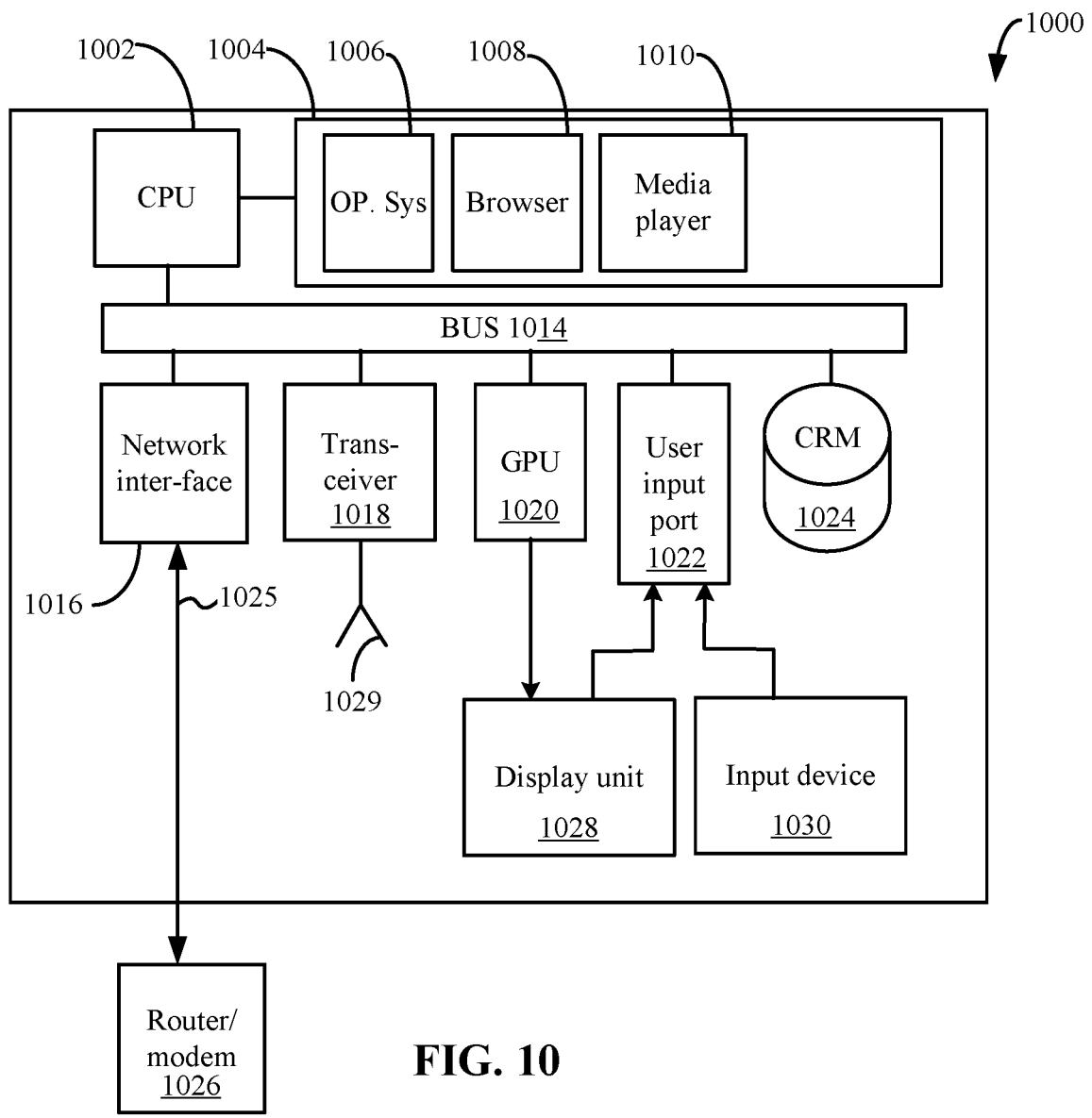
FIG. 10 depicts a diagrammatic view of an apparatus for viewing video content and advertisements.

Referring to FIG. 10, a diagrammatic view of an apparatus 1000 for viewing video content and advertisements is illustrated. In selected embodiments, the apparatus 1000 may include a processor (CPU) 1002 operatively coupled to a processor memory 1004, which holds binary-coded functional modules for execution by the processor 1002. Such functional modules may include an operating system 1006 for handling system functions such as input/output and memory access, a browser 1008 to display web pages, and media player 1010 for playing video. The memory 1004 may hold additional modules not shown in FIG. 10, for example modules for performing other operations described elsewhere herein.

A bus 1014 or other communication component may support communication of information within the apparatus 1000. The processor 1002 may be a specialized or dedicated microprocessor configured or operable to perform particular tasks in accordance with the features and aspects disclosed herein by executing machine-readable software code defining the particular tasks. Processor memory 1004 (e.g., random access memory (RAM) or other dynamic storage device) may be connected to the bus 1014 or directly to the processor 1002, and store information and instructions to be executed by a processor 1002. The memory 1004 may also store temporary variables or other intermediate information during execution of such instructions.

A computer-readable medium in a storage device 1024 may be connected to the bus 1014 and store static information and instructions for the processor 1002; for example, the storage device (CRM) 1024 may store the modules 1006, 1008, 1010 and 1012 when the apparatus 1000 is powered off, from which the modules may be loaded into the processor memory 1004 when the apparatus 1000 is powered up. The storage device 1024 may include a non-transitory computer-readable storage medium holding information, instructions, or some combination thereof, for example instructions that when executed by the processor 1002, cause the apparatus 1000 to be configured or operable to perform one or more operations of a method as described herein.

A communication interface 1016 may also be connected to the bus 1014. The communication interface 1016 may provide or support two-way data communication between the apparatus 1000 and one or more external devices, e.g., the streaming system 900, optionally via a router/modem 1026 and a wired or wireless connection. In the alternative, or in addition, the apparatus 1000 may include a transceiver 1018 connected to an antenna 1029, through which the apparatus 1000 may communicate wirelessly with a base station for a wireless communication system or with the router/modem 1026. In the alternative, the apparatus 1000 may communicate with a video streaming system 900 via a local area network, virtual private network, or other network. In another alternative, the apparatus 1000 may be incorporated as a module or component of the system 900 and communicate with other components via the bus 1014 or by some other modality.

The apparatus 1000 may be connected (e.g., via the bus 1014 and graphics processing unit 1020) to a display unit 1028. A display 1028 may include any suitable configuration for displaying information to an operator of the apparatus 1000. For example, a display 1028 may include or utilize a liquid crystal display (LCD), touchscreen LCD (e.g., capacitive display), light emitting diode (LED) display, projector, or other display device to present information to a user of the apparatus 1000 in a visual display.

One or more input devices 1030 (e.g., an alphanumeric keyboard, microphone, keypad, remote controller, game controller, camera or camera array) may be connected to the bus 1014 via a user input port 1022 to communicate information and commands to the apparatus 1000. In selected embodiments, an input device 1030 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1028, for example using a touch sensitive screen. A cursor control device may communicate direction information and command selections to the processor 1002 and control cursor movement on the display 1028. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, one or more segments for content from a first content delivery network during a playback session for the content, wherein the content includes a number of segments;
   evaluating, by the computing device, buffer occupancy of a buffer configured to store segments of the content for playback;
   evaluating, by the computing device, a number of times of a failure to download a segment for the content;
   evaluating, by the computing device, network bandwidth for receiving segments from the content;
   comparing, by the computing device, the buffer occupancy to a first threshold and the number of times of the failure to a second threshold;
   comparing, by the computing device, the network bandwidth to a third threshold; and
   determining, by the computing device, a switch from the first content delivery network to a second content delivery network during the playback session based on the comparing, wherein determining the switch from the first content delivery network to the second content delivery network is when the network bandwidth is below the third threshold and the buffer occupancy is below the first threshold.

2. The method of claim 1, wherein evaluating the buffer occupancy comprises:
   determining one or more samples of the buffer occupancy during a time period; and
   calculating an average buffer occupancy during the time period using the one or more samples.

3. The method of claim 2, wherein comparing the buffer occupancy comprises:
   comparing the average buffer occupancy to the first threshold.

4. The method of claim 3, wherein determining the switch from the first content delivery network to the second content delivery network comprises:
   determining when the average buffer occupancy meets the first threshold.

5. The method of claim 4, wherein determining the switch from the first content delivery network to the second content delivery network comprises:
   when the average buffer occupancy meets the first threshold, determining a predicted network bandwidth; and
   determining when the predicted network bandwidth meets the third threshold.

6. The method of claim 1, wherein evaluating the buffer occupancy comprises:
   using a sliding window to determine a set of samples for the buffer occupancy; and
   calculating an average buffer occupancy using the set of samples in the sliding window.

7. The method of claim 6, wherein evaluating the buffer occupancy comprises:
   receiving a new sample for a new time in the sliding window;
   removing an old sample that is not within the sliding window; and
   calculating the average buffer occupancy using the new sample and not the old sample.

8. The method of claim 7, wherein a value of the new sample is interpolated from other samples in the sliding window.

9. The method of claim 1, wherein evaluating the number of times of the failure comprises:
   counting the number of times of the failure for consecutive segments.

10. A method comprising:
    receiving, by a computing device, one or more segments for content from a first content delivery network during a playback session for the content, wherein the content includes a number of segments;
    evaluating, by the computing device, buffer occupancy of a buffer configured to store segments of the content for playback;
    evaluating, by the computing device, a number of times of a failure to download a segment for the content, wherein evaluating the number of times of the failure comprises counting the number of times of the failure for consecutive segments when using a lowest bitrate representation, and wherein the content is available in a plurality of representations at different bitrates;

comparing, by the computing device, the buffer occupancy to a first threshold and the number of times of the failure to a second threshold; and determining, by the computing device, a switch from the first content delivery network to a second content delivery network during the playback session based on the comparing.

11. A method comprising:

receiving, by a computing device, one or more segments for content from a first content delivery network during a playback session for the content, wherein the content includes a number of segments;

evaluating, by the computing device, buffer occupancy of a buffer configured to store segments of the content for playback;

evaluating, by the computing device, a number of times of a failure to download a segment for the content;

comparing, by the computing device, the buffer occupancy to a first threshold and the number of times of the failure to a second threshold;

determining, by the computing device, a switch from the first content delivery network to a second content delivery network during the playback session based on the comparing;

switching from the first content delivery network to the second content delivery network by requesting a segment from the content from the second content delivery network; and upon switching from the first content delivery network to the second content delivery network, marking, by the computing device, the first content delivery network as unavailable to be switched to for a period of time.

12. The method of claim 1, further comprising:

selecting the second content delivery network based on a ranking of a plurality of content delivery networks.

13. A non-transitory computer-readable storage medium containing instructions, that when executed, control a computer system to be operable for:

receiving one or more segments for content from a first content delivery network during a playback session for the content, wherein the content includes a number of segments;

evaluating buffer occupancy of a buffer configured to store segments of the content for playback;

evaluating a number of times of a failure to download a segment for the content;

evaluating network bandwidth for receiving segments from the content;

comparing the buffer occupancy to a first threshold and the number of times of the failure to a second threshold;

comparing the network bandwidth to a third threshold; and determining a switch from the first content delivery network to a second content delivery network during the playback session based on the comparing, wherein determining the switch from the first content delivery network to the second content delivery network is when the network bandwidth is below the third threshold and the buffer occupancy is below the first threshold.

14. The non-transitory computer-readable storage medium of claim 13, wherein evaluating the buffer occupancy comprises:

determining one or more samples of the buffer occupancy during a time period; and calculating an average buffer occupancy during the time period using the one or more samples.

15. The non-transitory computer-readable storage medium of claim 13, wherein evaluating the number of times of the failure comprises:

counting the number of times of the failure for consecutive segments.

16. The non-transitory computer-readable storage medium of claim 13, further comprising:

evaluating network bandwidth for receiving segments from the content; and comparing the network bandwidth to the third threshold.

17. An apparatus comprising:

one or more computer processors; and a non-transitory computer-readable storage medium comprising instructions, that when executed, control the one or more computer processors to be operable for:

receiving one or more segments for content from a first content delivery network during a playback session for the content, wherein the content includes a number of segments;

evaluating buffer occupancy of a buffer configured to store segments of the content for playback;

evaluating a number of times of a failure to download a segment for the content;

evaluating network bandwidth for receiving segments from the content;

comparing the buffer occupancy to a first threshold and the number of times of the failure to a second threshold;

comparing the network bandwidth to a third threshold; and determining a switch from the first content delivery network to a second content delivery network during the playback session based on the comparing, wherein determining the switch from the first content delivery network to the second content delivery network is when the network bandwidth is below the third threshold and the buffer occupancy is below the first threshold.

18. The method of claim 1, wherein determining the switch from the first content delivery network to the second content delivery network is when the number of times of the failure to download the segment meets the second threshold.

19. The non-transitory computer-readable storage medium of claim 13, wherein determining the switch from the first content delivery network to the second content delivery network is when the number of times of the failure to download the segment meets the second threshold.

20. The apparatus of claim 17, wherein determining the switch from the first content delivery network to the second content delivery network is when the number of times of the failure to download the segment meets the second threshold.

* * * * *